US006382864B1

(12) United States Patent
Moor

(10) Patent No.: US 6,382,864 B1
(45) Date of Patent: May 7, 2002

(54) FOLDER WITH RETAINING TAB

(75) Inventor: Marc L. Moor, Oakwood, OH (US)

(73) Assignee: The Mead Corporation, Dayton, OH (US)

(*) Notice: Subject to any disclaimer, the term of this patent is extended or adjusted under 35 U.S.C. 154(b) by 0 days.

(21) Appl. No.: 09/652,422

(22) Filed: Aug. 31, 2000

Related U.S. Application Data

(63) Continuation-in-part of application No. 09/526,929, filed on Mar. 16, 2000.

(51) Int. Cl.[7] .......................... A45D 40/00; G09B 19/10

(52) U.S. Cl. .......................... 402/79; 402/4; 402/80 R; 281/28; 281/30; 281/36; 281/38; 281/51; 229/67.1; 24/10 R; 24/11 PP; 24/11 CC; 24/11 HC; 24/11 M; 24/11 R; 211/69.1; 211/70.1; 206/37; 206/38

(58) Field of Search .............................. 281/30, 28, 36, 281/38, 51; 402/4, 79, 80 R; 229/67.1; 24/10 R, 11 PP, 11 CC, 11 HC, 11 M, 11 R; 211/69.1, 70.1; 206/37, 38; 248/205.3

(56) References Cited

U.S. PATENT DOCUMENTS

| | | | | |
|---|---|---|---|---|
| 151,591 | A | 6/1874 | Hinsdill | |
| 194,137 | A | 8/1877 | Dimmock | |
| 325,008 | A | 8/1885 | Pester | |
| 717,957 | A | 1/1903 | Weaver | |
| 792,747 | A | 6/1905 | Anderson et al. | |
| 803,464 | A | 10/1905 | Beck | |
| 852,871 | A | 5/1907 | Cohn | |
| 868,758 | A | 10/1907 | Bexell | |
| 868,835 | A | 10/1907 | Bexell | |
| 1,107,351 | A | 8/1914 | Proudfit | |
| 1,156,160 | A | 10/1915 | Lewis | |
| 1,371,459 | A | 3/1921 | Amlie | |
| 1,794,560 | A | 3/1931 | Styll | |
| 2,153,575 | A | 4/1939 | Kramer | 129/18 |
| 2,549,200 | A | 4/1951 | Hooks | 24/66 |
| 2,604,724 | A | 7/1952 | Watts | 45/0.5 |
| 2,848,163 | A | 8/1958 | Serrell | 235/61.12 |
| 3,911,531 | A | 10/1975 | Buturuga | 24/10 |
| 4,496,058 | A | 1/1985 | Harris et al. | 211/86 |

(List continued on next page.)

FOREIGN PATENT DOCUMENTS

| | | |
|---|---|---|
| EP | 0554693 | 8/1993 |
| FR | 2593313 | 7/1987 |
| FR | 2748694 | 11/1997 |
| NL | 7810440 | 4/1980 |

OTHER PUBLICATIONS

PCT International Search Report; PCT Application No. PCT/US 00/07103; filed on Mar. 17, 2000.

*Primary Examiner*—A. L. Wellington
*Assistant Examiner*—Mark T. Henderson
(74) *Attorney, Agent, or Firm*—Thompson Hine LLP

(57) ABSTRACT

A folder for receiving papers or other loose articles comprising a side panel and a retaining tab made of a generally flexible material and mounted onto the side panel. The retaining tab has a pair of openings formed therein, the openings being shaped and located such that a writing instrument may be received therethrough such that the writing instrument is securely received in the retaining tab.

13 Claims, 3 Drawing Sheets

U.S. PATENT DOCUMENTS 4,551,039 A 11/1985 Basseches .................... 402/60
4,583,562 A * 4/1986 Stewart .......................... 132/9
4,636,179 A 1/1987 Gentile et al. ................ 402/79
4,706,995 A 11/1987 Dopp .......................... 281/42
4,940,353 A 7/1990 Osono et al. ................. 402/79
5,015,114 A 5/1991 Miller ........................... 402/4
5,118,137 A * 6/1992 Walters ....................... 281/31
5,234,277 A 8/1993 Le .............................. 402/79
5,405,169 A 4/1995 Schwartz ..................... 281/16
5,417,509 A 5/1995 Schwartz ..................... 402/79
5,433,546 A 7/1995 Kershaw ...................... 402/79
5,572,815 A 11/1996 Kovner ......................... 40/404
5,598,969 A * 2/1997 Ong .......................... 229/67.1
5,709,496 A 1/1998 Werner et al. ................ 402/79
5,727,894 A 3/1998 Covey ......................... 402/79
5,755,337 A 5/1998 Linn ......................... 211/13.1
5,845,772 A 12/1998 Cieplak ................... 206/308.3
6,209,778 B1 * 4/2001 Henrikson et al. ......... 229/67.1
2001/0002751 A1 * 6/2001 Bauman et al. ............... 283/36

* cited by examiner

FOLDER WITH RETAINING TAB

This application is a continuation-in-part of Ser. No. 09/526,929 filed Mar. 16, 2000, the contents of which are hereby incorporated by reference.

FIELD OF THE INVENTION

The present invention is a folder for receiving papers, and more particularly, to a folder for receiving papers that has a tab for receiving and retaining a writing instrument.

BACKGROUND OF THE INVENTION

Folders are often used by students and other users to store loose leaf papers, hand-outs, pamphlets, and other items. Often times the contents of the folder are used for taking notes, writing reminders, etc., and therefore it would be useful to provide a folder that includes a mechanism for receiving and retaining a writing instrument. Furthermore, folders are often carried in backpacks, briefcases and the like, and when the folders are used to store loose papers and carried in these carriers, loose papers in the folder can fall out when the folder is inverted or shaken as it is carried. Accordingly, there is a need for a folder that includes a mechanism for receiving and retaining a writing instrument, and that can retain loose papers inside the folder.

SUMMARY OF THE INVENTION

The present invention is a folder that includes a retaining tab for receiving and retaining a writing instrument. The retaining tab also helps to maintain papers in the folder. In a preferred embodiment, the invention is a folder for receiving papers or other loose articles comprising a side panel and a retaining tab made of a generally flexible material and mounted onto the side panel. The retaining tab has a pair of openings formed therein, the openings being shaped and located such that a writing instrument may be received therethrough such that the writing instrument is securely received in the retaining tab.

Other objects and advantages of the present invention will be apparent from the following description and the accompanying drawings.

DETAILED DESCRIPTION

Figure 1:
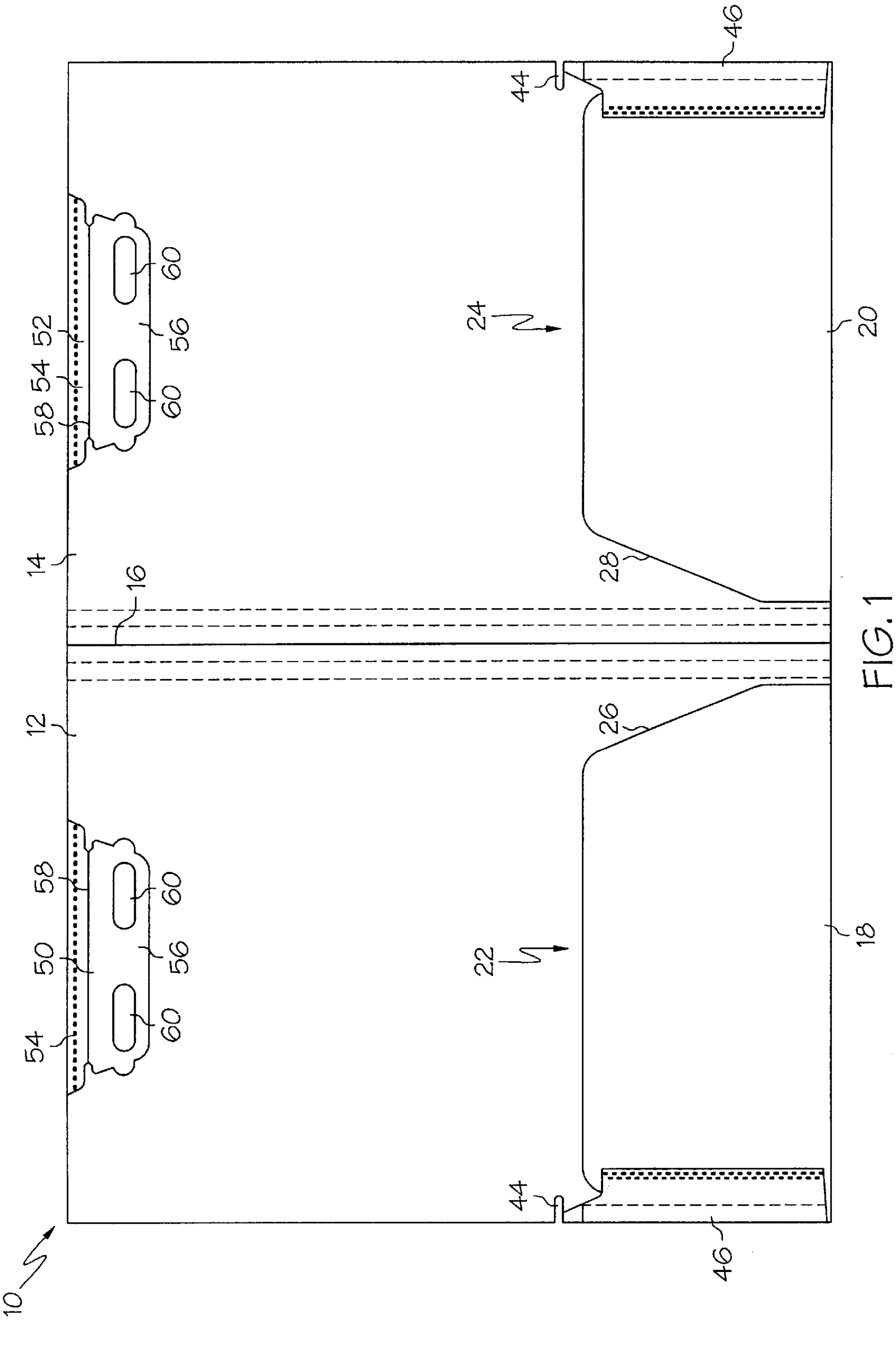
FIG. 1 is a front view of one embodiment of the folder of the present invention, with the folder shown in its open position.

As shown in FIG. 1, the present invention is a folder 10 having a pair of opposed, attached side panels 12, 14 separated by a center fold line 16. Each side panel 12, 14 includes a lower panel 18, 20 facing its respective side panel. The lower panel 18 and side panel 12 form a pocket 22 for receiving papers and other loose item between the lower panel 18 and side panel 12. Similarly, the lower panel 20 and side panel 14 form a pocket 24 between the lower panel 20 and the side panel 14. Each lower panel 18, 20 each includes a tapered inner surface 26, 28 to facilitate sliding papers under the lower panels 18, 20 in a lateral direction.

Figure 2:
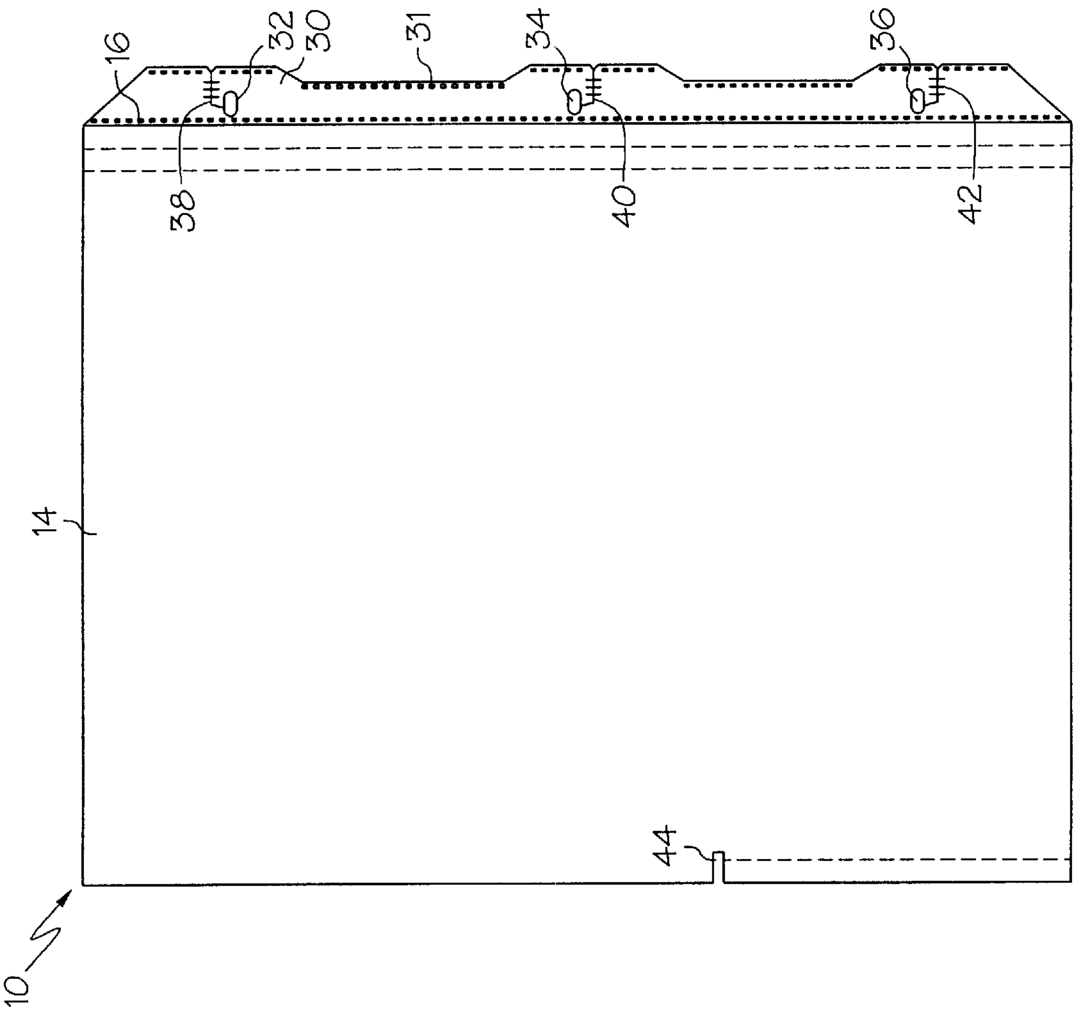
FIG. 2 is a back view of the folder of FIG. 1, shown in its closed position.

As shown in FIG. 2, the folder 10 includes a spine 30 extending generally rearwardly from the center fold line 16, and the spine includes a set of three spine holes 32, 34, 36 for mounting the folder to a three ring binder. The spine 30 may include a set of through cuts 38, 40, 42 that extend from the outer edge 31 of the spine 30 to the spine holes 32, 34, 36 to provide a quick attach feature to the folder 10. As shown in FIG. 1, the folder 10 may also include cut-outs 44 and/or expansion panels 46 such that the pockets 22, 24 may be expanded to receive relatively large volumes of paper, as described in Ser. No. 09/526,929.

The folder 10 includes a pair of retaining tabs 50, 52, each tab preferably being mounted along the upper edge of the respective side panel 12, 14. The retaining tabs 50, 52 are preferably made from a generally flat, flexible piece of material, such as polypropylene, and each retaining tab 50, 52 includes an attachment surface 54 and a flap surface 56 separated by a tab fold line 58. The attachment surface 54 is attached to the respective side panel 12, 14, such as by heat staking, and the flap surface 56 is not attached to the respective side panel 12, 14. The flap surfaces 56 are free to pivot relative to the respective attachment surface 54 about the tab fold line 58.

Figure 3:
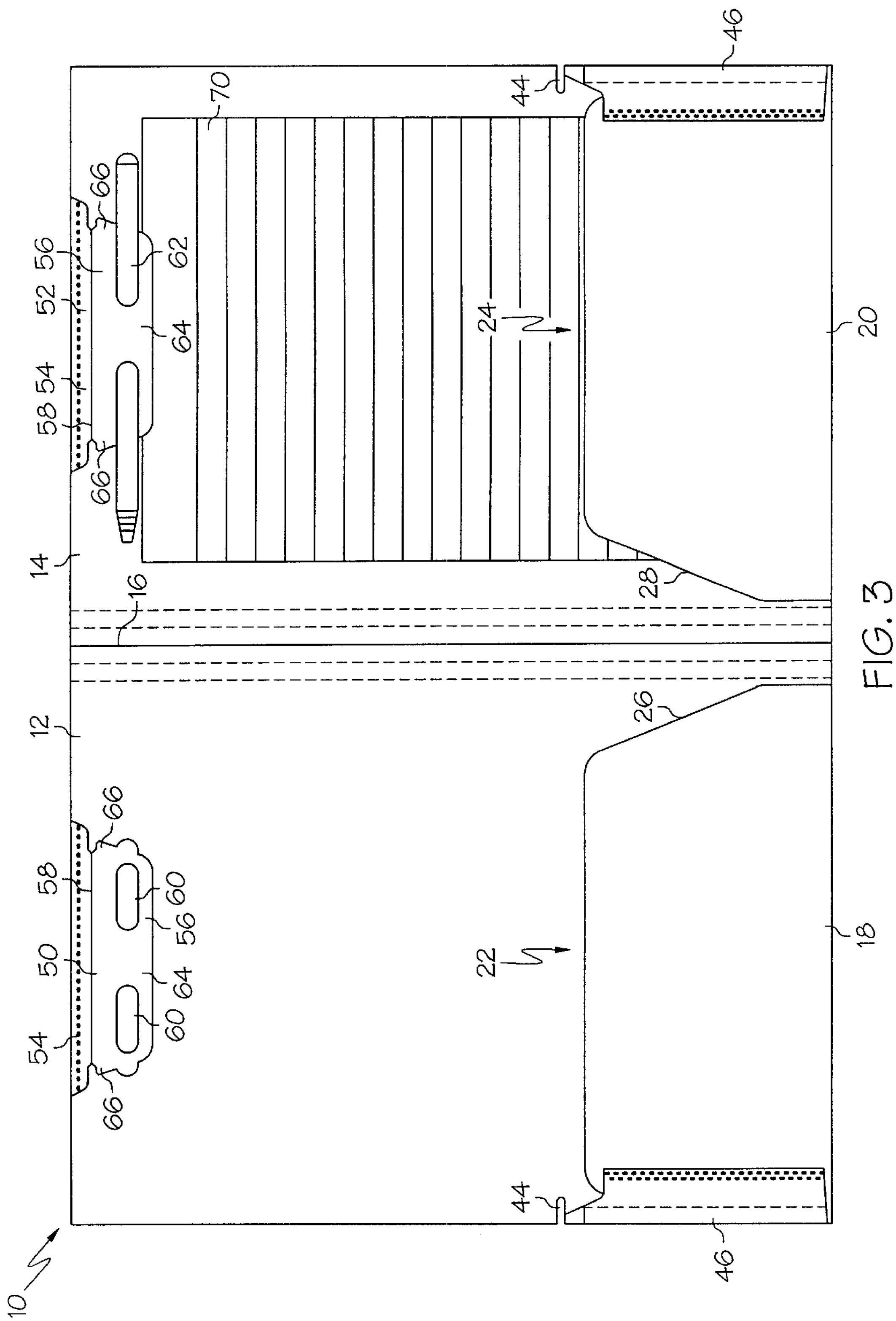
FIG. 3 is a front view of the folder of FIG. 1, shown with a writing instrument received in the retaining tab and a paper in the folder.

Each flap surface 56 includes a pair of openings or cut-outs 60 that are shaped and located to receive a writing instrument therethrough. The openings 60 are preferably elongated circles, such as ovals or ellipses, and the longitudinal axes of the openings 60 are preferably aligned. The width of each opening 60 is preferably equal to or slightly less than the width of the writing instrument to be received. In this manner, as shown in FIG. 3, a writing instrument, such as a pen 62, may be passed through the openings 60 such that the pen 62 is retained in the retaining tab 52. The pen 62 forces the central portion 64 of the retaining tab 52 upwardly over the top of the pen 62, and forces the outer portions 66 of the retaining tab 52 downwardly under the pen 62, which deforms the retaining tab and serves to grip the pen. The frictional engagement between the pen 62 and the edges of the openings 60 further aids in gripping the pen in place. The tab 52 should have sufficient stiffness to grip the writing instrument.

As shown in FIG. 3, when a paper 70 is located in the pocket 24, the upper portion of the paper 70 can be located between the flap surface 56 of the tab 52 and the side panel 14. In this manner, when the folder 10 is inverted or shaken, the paper 70 slides in the cavity between the flap surface 56 and the side panel 14 and is retained in the folder 10 by the attachment surface 54. Thus, the retaining tabs 50, 52 also serve to retain loose papers and other items in the folder 10. The retaining tabs 50, 52 provide this feature regardless of whether a writing instrument 62 is received in the retaining tabs 50, 52.

The folder 10 need not include two side panels 12, 14, but may include only a single side panel. Furthermore, the retaining tab of the present invention may be mounted onto nearly any component, such as a binder, book, calender, portfolio, planner, notebook, etc.

Having described the invention in detail and by reference to the preferred embodiments, it will be apparent that modifications and variations thereof are possible without departing from the scope of the invention.

What is claimed is:

1. A folder for receiving papers or other loose articles comprising:

a side panel; and a generally flexible retaining tab mounted onto said side panel, said retaining tab having a pair of openings formed therein, said openings being shaped and located such that a writing instrument may be received therethrough such that said writing instrument is securely received in said retaining tab, and wherein said tab is coupled to said side panel such that papers can be trapped between said side panel and said tab to maintain said papers in said folder.

2. The folder of claim 1 wherein said openings are generally oval-shaped and each opening has a longitudinal axis, and wherein the longitudinal axes of said openings are aligned.

3. The folder of claim 1 further comprising an auxiliary side panel pivotally mounted to said side panel, and wherein said side panel and said auxiliary side panel each include a pocket to receive papers therein.

4. The folder of claim 1 wherein each of said openings have a width, the width of each opening being about equal to the width of said writing instrument.

5. The folder of claim 1 wherein said tab is coupled to a top edge of said side panel.

6. The folder of claim 2 wherein said tab includes an attachment surface and a flap surface, said attachment surface being coupled to said folder and said openings being formed in said flap surface.

7. The folder of claim 6 wherein said tab includes a fold line separating said flap surface and said attachment surface, and wherein said flap surface can pivot about said fold line.

8. The folder of claim 3 wherein said side panel and said auxiliary side panel each pivot about a central fold line and said folder further includes a spine extending generally rearwardly from said central fold line.

9. The folder of claim 8 wherein said spine includes a plurality of holes formed therein for attaching said folder to a binder.

10. A folder for receiving papers or other loose articles comprising:

a first side panel;

a first lower panel coupled to and facing said first side panel to form a first pocket therebetween;

a second side panel, said first and second side panels being mounted in opposed relation and pivotably attached at a central fold line;

a second lower panel coupled to and facing said second side panel to form a second pocket therebetween; and a retaining tab made of a generally flexible material and including an attachment surface and a flap surface, said attachment surface being mounted onto said first side panel, said retaining tab having a pair of generally oval-shaped openings formed therein, each opening having a longitudinal axis, the longitudinal axes of said openings being aligned, said openings being shaped and located such that a writing instrument may be received therethrough such that said writing instrument is securely received in said retaining tab.

11. A folder for receiving papers or other loose articles comprising:

a side panel; and a generally flexible retaining tab coupled to said side panel, said retaining tab having a pair of openings formed therein, said openings being shaped and located such that a writing instrument may be received therethrough such that said writing instrument is securely received in said retaining tab, said tab including an attachment surface and a flap surface, said attachment surface being coupled to said folder and said openings being formed in said flap surface.

12. A folder for receiving papers or other loose articles comprising:

a side panel; and a generally flexible retaining tab pivotally mounted to said side panel, said retaining tab having a pair of openings formed therein, said openings being shaped and located such that a writing instrument may be received therethrough such that said writing instrument is securely received in said retaining tab.

13. The folder of claim 12 wherein said retaining tab is a generally flat piece of material and includes a pair of longitudinal edges, and wherein said retaining tab is pivotally coupled to said side panel along one of said longitudinal edges.

* * * * *